United States Patent [19]

Saito et al.

[11] Patent Number: 4,642,046

[45] Date of Patent: Feb. 10, 1987

[54] PULSE COMBUSTOR

[75] Inventors: Kazuo Saito, Fujinomiya; Takashi Matsuzaka, Fuji; Mitsuyoshi Chiba, Fuji; Shigeto Sumitani, Fuji; Masami Yodo, Fuji; Hiroyuki Araya, Fujinomiya, all of Japan

[73] Assignee: Kabushiki Kaisha Toshiba, Kawasaki, Japan

[21] Appl. No.: 643,384

[22] Filed: Aug. 23, 1984

[30] Foreign Application Priority Data

Oct. 28, 1983 [JP] Japan ................... 58-202325

[51] Int. Cl.4 .................. F23D 14/62; F23C 11/04
[52] U.S. Cl. ........................ 431/354; 431/1;
431/264; 60/39.76
[58] Field of Search ............ 431/1, 9, 173, 263, 431/264, 354; 60/39.76, 39.77

[56] References Cited

U.S. PATENT DOCUMENTS 2,938,337  5/1960  Mirza ................. 60/39.76 X
3,179,150  4/1965  Arnold ................ 431/173
3,276,505 10/1966  Huber et al. ........... 431/1
4,176,651 12/1979  Backus ................ 431/1 X
4,309,977  1/1982  Kitchen ............... 431/1 X

FOREIGN PATENT DOCUMENTS 1039035 10/1953  France ................. 60/39.77
0087518  6/1982  Japan .................. 431/173
0033026  2/1983  Japan .................. 431/1

Primary Examiner—Margaret A. Focarino
Attorney, Agent, or Firm—Cushman, Darby & Cushman

[57] ABSTRACT

A pulse combustor has a main body in which a cylindrical mixing chamber and a combustion chamber are formed. An air inlet port and a fuel inlet port are formed in the body to open into the mixing chamber. These inlet ports are located on the same circumference of the inner periphery of the mixing chamber and spaced from each other. An air supply pipe for introducing air into the mixing chamber is connected at one end to the air inlet port, and a fuel supply pipe for introducing fuel gas into the mixing chamber is connected at one end to the fuel inlet port. The air supply pipe extends in a predetermined direction so as to cause the air introduced into the mixing chamber to flow while rotating in one direction along the inner periphery of the mixing chamber. The fuel supply pipe extends in a predetermined direction to cause the fuel to be introduced into the mixing chamber along a direction opposite the direction in which the air rotates.

20 Claims, 20 Drawing Figures

F I G. 14
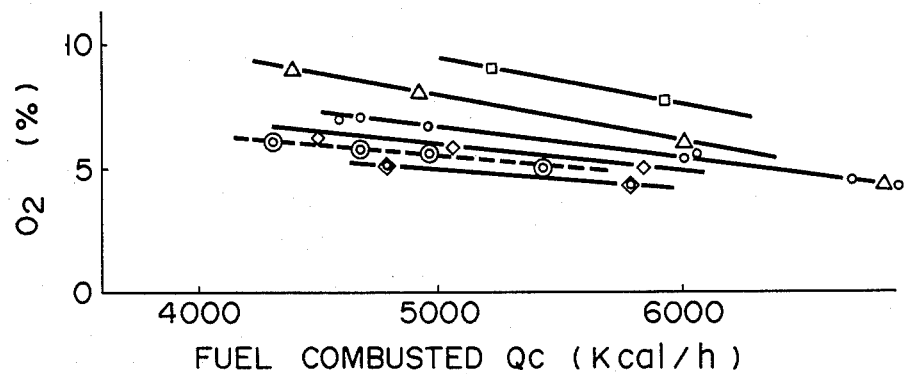
F I G. 15
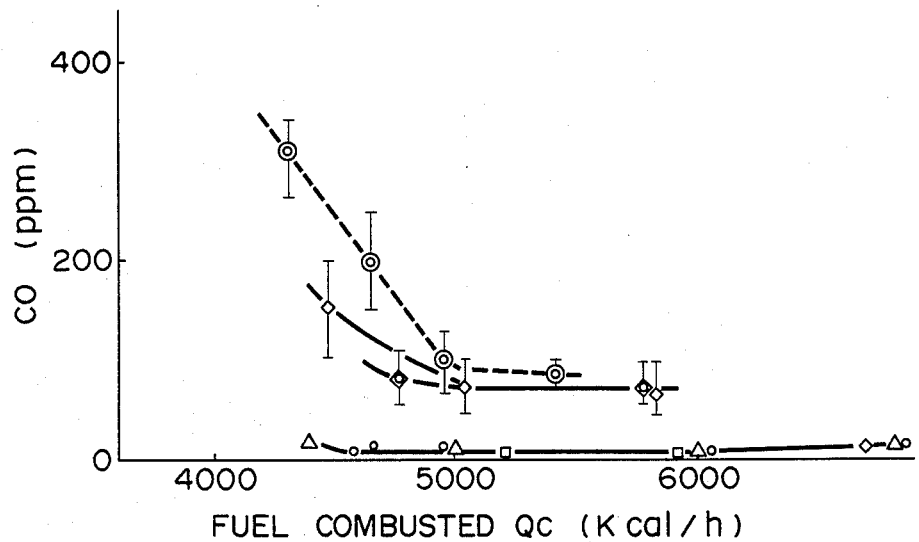

PULSE COMBUSTOR

BACKGROUND OF THE INVENTION

The present invention relates to a pulse combustor wherein a mixture gas of air and fuel is intermittently supplied into a combustion chamber and, within this combustion chamber, an explosive combustion is caused to take place repeatedly in the form of a pulse.

Generally, a pulse combustor has a combustion chamber and a cylindrical mixing chamber which communicates with the upstream side of the combustion chamber. An air supply pipe and a fuel supply pipe are respectively connected, at one end, to the mixing chamber. Air and fuel are respectively introduced into the mixing chamber through the air supply pipe and fuel supply pipe. The air and fuel thus introduced are mixed together in the mixing chamber, and then this mixture gas is subjected to explosive combustion within the combustion chamber.

In this type of pulse combustor, in order to cause the pulse combustion to take place under a stable and moderate condition, it is necessary to quickly mix together the air and fuel introduced into the mixing chamber through the air supply pipe and fuel supply pipe. In a prior art pulse combustor of this type, however, the air supply pipe and fuel supply pipe are provided in such a manner that each of their axes extends in a direction to intersect a central axis of the mixing chamber at right angles thereto while their axes intersect each other at right angles. The air stream and fuel gas stream introduced into the mixing chamber is mixed together by colliding against each other substantially at right angles. For this reason, a mixing of the air with the fuel gas fails to be effected uniformly, so that the quality of their mixture is bad. At the same time, it was also possible that at the time of ignition which starts the pulse combustor, the air-fuel mixture gas will fail to be ignited by an ignition plug. Further, since the air and fuel gas introduced into the mixing chamber each impinge, substantially perpendicularly, upon the inner wall surface of the mixing chamber, the resistance to their inflow into the mixing chamber increases. As a result, the problem that the air and fuel gas fail to be supplied smoothly may also be raised. For this reason, particularly where a fuel having a relatively high combustion rate such as a hydrogen-based fuel is used, its combustion characteristic is likely to be degraded and, at the same time, it is likely that the pulsation will be unstable.

SUMMARY OF THE INVENTION

The present invention has been made under the above-mentioned circumstances and is intended to provide a pulse combustor which makes it possible to improve the mixture of air and fuel which have been introduced into a mixing chamber, thereby enabling the ignition to be reliably started, and which also makes it possible to supply the air and fuel smoothly into the mixing chamber, thereby improving the combustion characteristics and also stabilizing the pulsation of the pulse combustion.

To attain the above object, according to one aspect of the present invention, an air supply pipe connected at one end to the mixing chamber extends so as to cause the air introduced from the air supply pipe into the mixing chamber to rotate in one direction along the inner surface of the mixing chamber. Further, a fuel supply pipe connected at one end to the mixing chamber extends therefrom in a specified direction so that the fuel to be introduced into the mixing chamber flows in a direction that is opposite that in which the air is caused to rotate. For this reason, the fuel whirls or rotates within the mixing chamber together with the air, so that both the fuel and air can be sufficiently mixed with each other. Further, since air and fuel can be smoothly supplied into the mixing chamber, it is possible to improve the combustion characteristics and, at the same time, stabilize the pulsation of the pulse combustion.

According to another aspect of the present invention, a projection for causing turbulence in the mixing chamber is provided on the peripheral edge of at least one of an air inlet port and fuel inlet port of the mixing chamber. The fuel introduced into the mixing chamber and caused to rotate with the air is guided toward a center of the mixing chamber by the action of the projection. Accordingly, the air and fuel are more sufficiently mixed with each other.

BRIEF DESCRIPTION OF THE DRAWINGS

FIGS. 1 to 4 show a pulse combustor according to an embodiment of the present invention, in which FIG. 1 is a side view schematically showing the pulse combustor as a whole, FIG. 2 is a side view showing the essential part of the pulse combustor, FIG. 3 is a sectional view taken along the line III—III in FIG. 2, and FIG. 4 is a sectional view taken along the line IV—IV in FIG. 2;

FIG. 14 is a combustion characteristic diagram showing the relationship between the quantity combusted and the $O_2$ concentration in the exhaust gas, established in regard to each modification shown in FIGS. 12A to 12F; and FIG. 15 is a combustion characteristic diagram showing the relationship between the quantity combusted and the CO concentration in the exhaust gas, established in regard to each modification shown in FIGS. 12A to 12F.

DETAILED DESCRIPTION OF THE PREFERRED EMBODIMENT

An embodiment of the present invention will now be described in detail with reference to the accompanying drawings.

Figure 1:
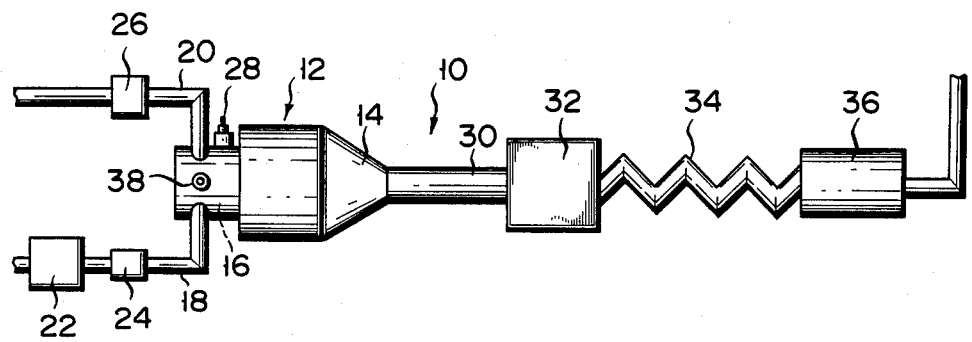
Figure 2:
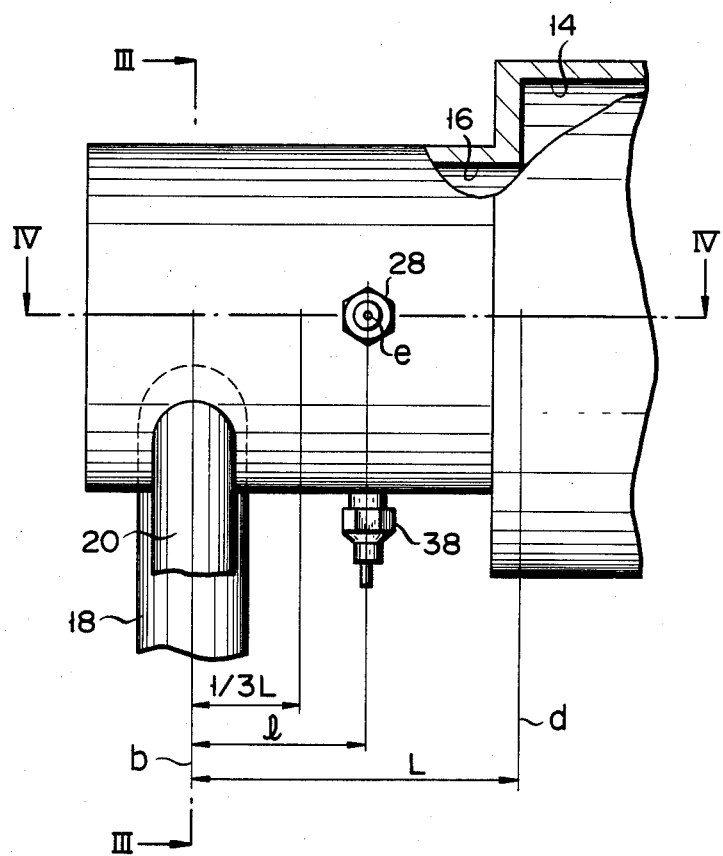

As shown in FIGS. 1 and 2, a pulse combustor 10 has a main body 12 which is shaped like a stepped cylinder. Within the main body, a cylindrical combustion chamber 14 and a mixing chamber 16 shaped like a bottomed cylinder and connected at its open end to the upstream end portion of combustion chamber 14 are respectively defined. An air supply pipe 18 and a fuel supply pipe 20 are respectively connected, at one end, to the peripheral-wall portion of the mixing chamber 16 residing at the closed-end side thereof. Air is supplied into the air supply pipe 18 through a suction muffler 22 and an air flap valve 24. Further, a fuel gas is supplied into the fuel supply pipe 20 through a fuel flap valve 26. Air and fuel are respectively introduced into the mixing chamber 16 through the supply pipes 18 and 20 and are mixed with each other within the mixing chamber. When the pulse combustor 10 is started, air is supplied through the air supply pipe 18 by the operation of a blowing fan (not shown) and, at the same time, a mixture gas of the air and fuel mixed within the mixing chamber 16 is ignited by an ignition plug 28 mounted on the main body 12. Thus, the fuel-air mixture gas is subjected to explosive combustion within the combustion chamber 14. After the pulse combustor 10 is started, the air flap valve 24 and fuel flap valve 26 are intermittently opened and closed due to the pressure of the exploding fuel-air mixture and negative pressure both produced within the mixing chamber 16, whereby the air and fuel are respectively intermittently supplied into the mixing chamber. The fuel-air mixture gas supplied into the combustion chamber 14 is brought into contact with a high-temperature residual gas in the combustion chamber 14 and also with the inner wall surface thereof which is kept at a high temperature, and is ignited automatically. Thereafter, the explosive combustion is repeatedly effected in the form of a pulse combustion. A tail pipe 30 is connected to the downstream end of the combustion chamber 14. Exhaust gas in the combustion chamber 14 is discharged outside the pulse combustor 10 through the tail pipe 30, decoupler 32, heat exchanger 34 and exhaust muffler 36. In FIGS. 1 and 2, reference numeral 38 denotes a flame rod for detecting the ignition in the combustion chamber 14.

Figure 3:
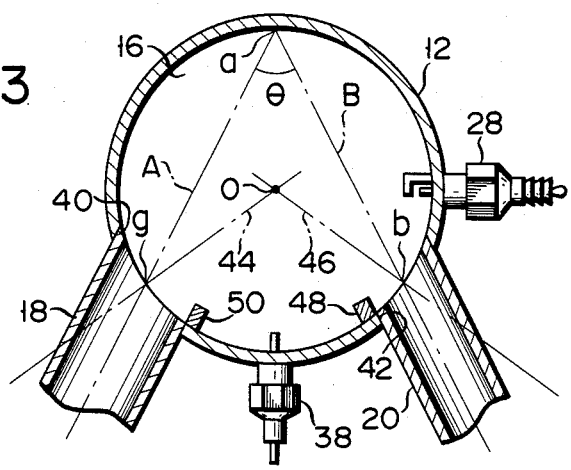

The mixing chamber 16, air supply pipe 18 and fuel supply pipe 20 will now be described more detail. As shown in FIG. 3, the peripheral wall of the main body 12 is formed with an air inlet port 40 and fuel inlet port 42 which are opened into the mixing chamber 16. These inlet ports 40, 42 are formed so that respective center is located on the same circumference of the inner peripheral wall, and are spaced from each other at a specified angle in the circumferential direction of the cylindrical mixing chamber 16. One end of the air supply pipe 18 is connected to the air inlet port 40 while one end of the fuel supply pipe 20 is connected to the fuel inlet port 42. It should be noted here that the fuel supply pipe 20 is so formed as to have an inner diameter smaller than that of the air supply pipe 18.

Figure 5:
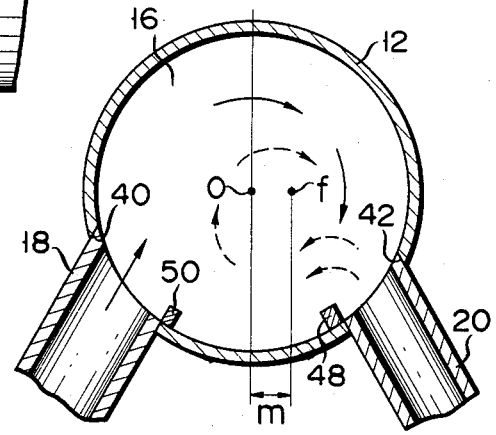
FIG. 5 is a sectional view corresponding to FIG. 3 which shows the flow of air and fuel.

The air supply pipe 18 is connected to the main body 12 so that it is inclined to the outer periphery of the mixing chamber 16 along its circumference. That is to say, the air supply pipe 18 is provided such that its axis A is inclined at a specified angle from a straight line 44, which intersects the axis of the mixing chamber 16 at right angles and passes through the center of the air inlet port 40, toward the fuel inlet port 42. As shown in FIG. 5 by arrows of solid line, the air introduced into the mixing chamber 16 from the air supply pipe 18 is allowed to flow while rotating along the inner peripheral wall surface of the mixing chamber 16, whereby an eddy of air is formed in the same.

In contrast, the fuel supply pipe 20 is connected to the main body 12 so that the fuel gas supplied from the supply pipe 20 into the mixing chamber is directed in a direction opposite the direction in which the eddy of air whirls or rotates. That is to say, the fuel supply pipe 20 is provided such that its axis B is inclined with respect to a straight line 46, which intersects the axis of the mixing chamber 16 at right angles and passes through a center of the fuel inlet port 42, at a specified angle toward the air inlet port 40.

Further, the supply pipes 18 and 20 extend in such a manner that the angle $\theta$ defined between their respective axes A and B is not greater than 90°. It is preferable to dispose both pipes such that said angle of $\theta$ falls within the range of 60°±20°. In this embodiment, the supply pipes 18 and 20 are provided so that their axes A, B may intersect each other on the inner periphery of the mixing chamber 16.

Figure 4:
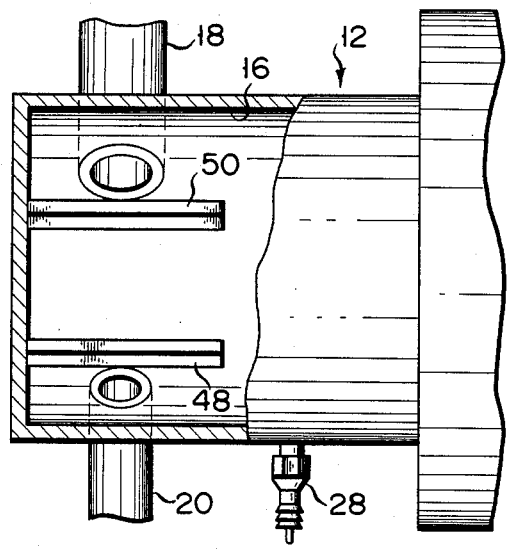

On the other hand, as shown in FIGS. 3 and 4, first and second linear projections 48, 50 for causing turbulence are provided on those portions of the inner peripheral surface of the mixing chamber 16 which correspond to the peripheries of the fuel inlet port 42 and air inlet port 40. The first projection 48 is provided on that peripheral edge portion of the fuel inlet port 42 which resides on the side of the air inlet port 40. The first projection 48 protrudes radially and inwardly of the mixing chamber and extends axially thereof. The second projection 50 is provided on that peripheral edge portion of the air inlet port 40 which resides on the side of the fuel inlet port 42. The second projection protrudes toward the center of the mixing chamber 16 and is aligned along the axis of the mixing chamber.

The above-mentioned ignition plug 28 is provided at the position shown in FIGS. 2 and 3. As viewed from the circumference of the mixing chamber 16, the ignition plug 28 is located between a first limit position a, i.e., the intersection of the axis A of the air supply pipe and the axis B of the fuel supply pipe, and a second limit position b where the axis of the fuel inlet port 42 passes through the inner peripheral wall of the chamber 16. As viewed from the axis O of the mixing chamber 16, the ignition plug 28 is provided at a position e which is located between the downstream end of the chamber 16 and the air supply pipe 18 and is spaced from the center b of the fuel inlet port 42 by a distance l equal to or greater than ⅓ of the distance L between said center b and the plane d in the downstream end of the mixing chamber 16 lies. Further, the flame rod 38 which detects ignition is disposed on the same circumference of the peripheral wall of the mixing chamber 16 where the ignition plug 28 is provided, and at the position which corresponds to an intermediate position between the air inlet port 40 and the fuel inlet port 42.

Figure 6:
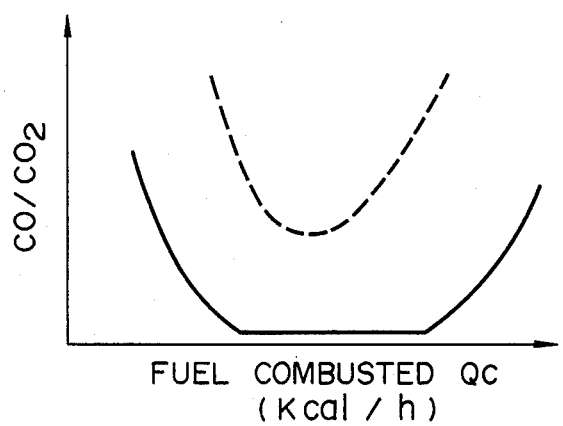
FIG. 6 is a combustion characteristic diagram showing the relationship between the fuel combusted and the ratio $CO/CO_2$ in the exhaust gas.

The operation of the pulse combustor 10 having the above construction will now be described. The air introduced from the air supply pipe 18 into the mixing chamber 16 flows along the inner peripheral surface of this chamber 16, whereby an eddy of air rotating clockwise in FIG. 5 is formed. As it flows into the mixing chamber 16, the air is prevented, by the second projection 50, from advancing toward the fuel inlet port 42. The fuel gas introduced from the fuel supply pipe 20 into the mixing chamber 16 is ejected in a direction opposite the rotation of the air, and is caused to rotate counterclockwise within the mixing chamber 16. In this case, however, since the amount of the air introduced into the mixing chamber is greater than the amount of the fuel gas introduced, the direction of the flow of the fuel gas is forcibly turned to the direction of airflow by the force of this airflow, as shown in FIG. 5 by the arrows of dotted lines. As a result, as shown in FIG. 5, an eddy of the fuel-air mixture gas is produced in such a manner as to rotate or whirl clockwise about a position f displaced by a distance m from the center O of the mixing chamber 16 toward the side of the fuel inlet port 42. In this case, it has been experimentally confirmed that this eddy is developed at a position between the axis of the air supply pipe 18 and the downstream end of the mixing chamber 16, more precisely close to the pipe 18. Because of the eddy in the mixing chamber 16, the air and the fuel gas is more thoroughly mixed and, at the same time, it is also possible to enhance the reliability with which starting ignition is effected. Further, the resistance to the inflow of the air and fuel gas from the air supply pipe 18 and fuel supply pipe 20 into the mixing chamber 16 is also lower than that which is produced in the prior art pulse combustor, so that it is possible to readily supply air and fuel gas. FIG. 6 shows the relationship between the fuel combusted and the value of $CO/CO_2$ in the exhaust gas. In this diagram, the solid line indicates a characteristic curve of the pulse combustor 10 while the broken line indicates that of a prior art pulse combustor. From FIG. 6, it is understood that the pulse combustor 10 is improved as compared with that of the prior art in respect to its combustion characteristic and, at the same time, the pulsation of the former combustor is stabilized.

Further, since the projections 48 and 50 are respectively provided on the periphery of the fuel inlet port 42 and the air inlet port 40, the fuel gas ejected from the fuel supply pipe 20 into the mixing chamber 16 is guided by the projections toward the center of the mixing chamber without being drawn toward the air inlet port 40 along the inner periphery of the mixing chamber. For this reason, the mixing condition of the air and fuel gas is further improved, with the result that a uniform combustion of the mixture gas is accomplished.

Figure 7:
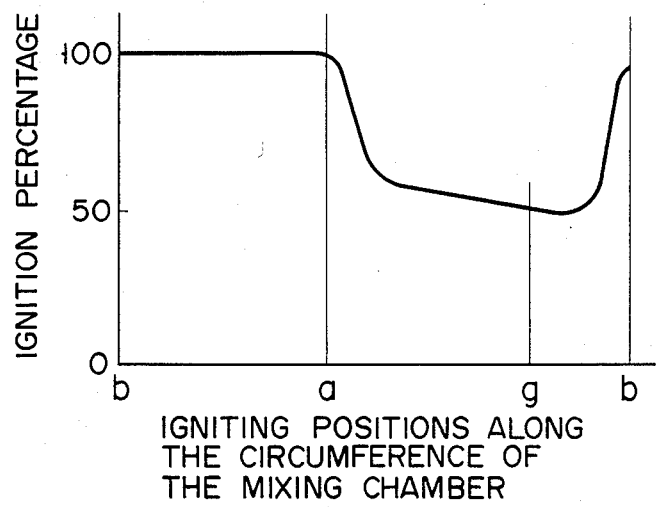
FIG. 7 is a characteristic diagram showing the relationship between the respective igniting positions along the circumference of the mixing chamber of the pulse combustor and the ignition percentage.
Figure 8:
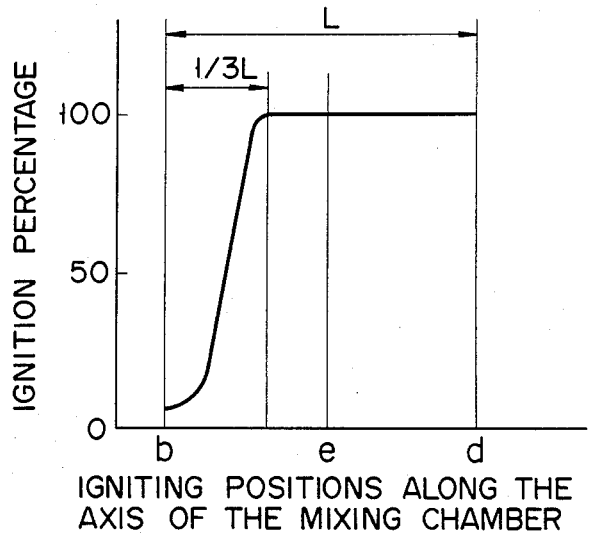
FIG. 8 is a characteristic diagram showing the relationship between the respective igniting positions taken along the axis of the mixing chamber and the ignition percentage.

FIG. 7 shows, as the result of experiments, the ignition percentage (%) at the respective igniting positions (g represents the center position of the air inlet port) taken along the circumference of the mixing chamber 16. FIG. 8 shows, as the results of experiments, the ignition percentage (%) at the respective positions taken along the axis of the mixing chamber 16. As seen from these curve diagrams, when the mounting position of the igniting plug 28 is set at any given position e falling within the above-mentioned range, an excellent ignition percentage is obtained, so that the fuel-air mixture gas at the time of starting the pulse combustor can be ignited more reliably.

The present invention is not limited to the above-mentioned embodiment but permits various modifications to be made without departing from the spirit and scope of the invention. For instance, the above-mentioned embodiment is so constructed as to have the first and second projections 48 and 50. However, the invention permits only one of such projections to be provided. Further, the invention may be also so constructed as to have no projections at all. Even in this case, it is possible to provide a pulse combustor with excellent combustion characteristics as compared with the prior art pulse combustor.

Figure 9:
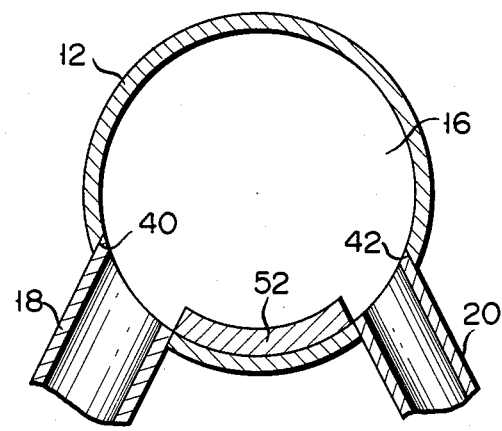
FIGS. 9 to 11 are each a sectional view corresponding to FIG. 3, which shows a different modification of the present invention.
Figure 10:
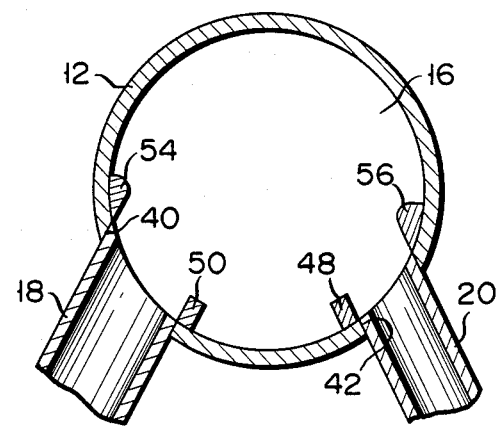
Figure 11:
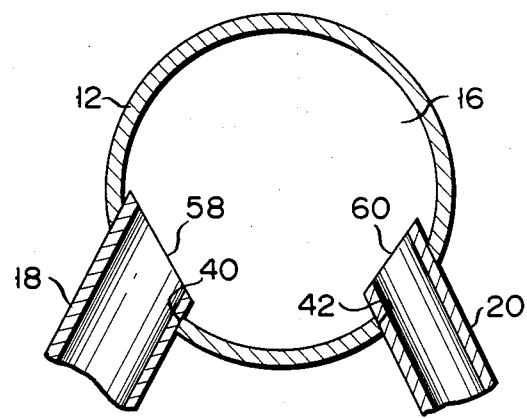

Further, as shown in FIG. 9, instead of the first and second projections, a single arc-shaped projection 52 extending from the periphery of the air inlet port 40 at the side of the fuel inlet port to the periphery of the fuel inlet port 42 at the side of the air inlet port may be provided. Further, as shown in FIG. 10, in addition to the first and second projections 48 and 50, a third projection 54 may be provided at the periphery of the air inlet port 40 to be opposite the first projection, and a fourth projection 56 may be provided at the periphery of the fuel inlet port 42 to be opposite the second projection. Further, the invention also permits providing ring-like projections which extend over the respective entire periphery of the air inlet port 40 and fuel inlet port 42, respectively. In this case, as shown in FIG. 11, it is possible to cause the ends 58 and 60 of the air supply pipe 18 and fuel supply pipe 20 to protrude into the interior of the mixing chamber 16 so as to serve as the respective ring-like projections.

Figure 12A:
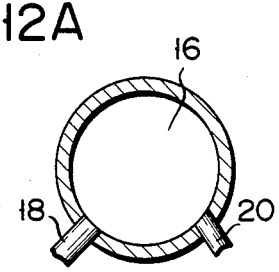
FIGS. 12A to 12F are each a sectional view corresponding to FIG. 3, which shows a different modification of the present invention.
Figure 12B:
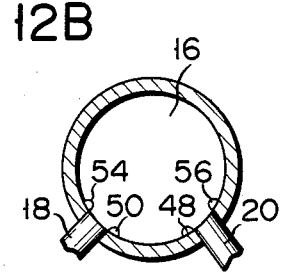
Figure 12C:
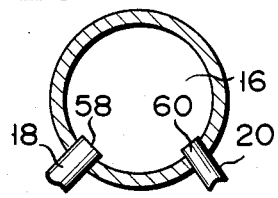
Figure 12D:
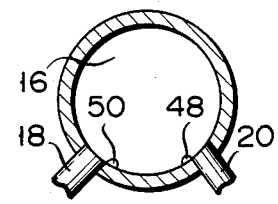
Figure 12E:
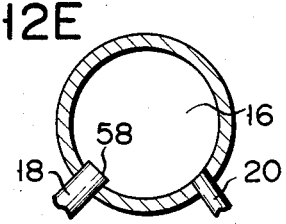
Figure 12F:
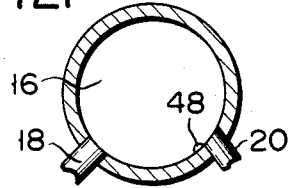
Figure 13:
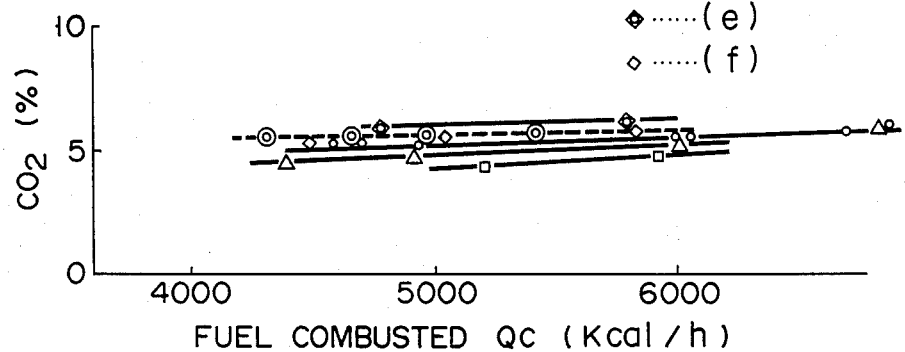
FIG. 13 is a combustion characteristic diagram showing the relationship between the fuel combusted and the CO concentration in the exhaust gas, established in regard to each modification shown in FIGS. 12A to 12F.

FIG. 12A shows a pulse combustor provided with no projection for causing turbulence in the mixing chamber, and FIGS. 12B to 12F show pulse combustors respectively provided with various turbulence-forming projections. FIGS. 13 to 15 are graphic diagrams which compare the combustion characteristics of the pulse combustors shown in FIGS. 12A to 12F. In FIGS. 13 to 15, lines prepared by connecting the illustrated symbols indicated by the notations (a) to (f) indicate the combustion characteristics of the pulse combustors of FIGS. 12A to 12F. As seen in FIGS. 13 to 15, the pulse combustors having various projections each has a low amount of CO in the exhaust gas, are high in combustion efficiency, and has an excellent, stable pulsation.

What is claimed is:
1. A pulse combustor comprising:
a main body including;
   an interior cylindrical mixing chamber having a first closed end and a second open end,
   and a combustion chamber communicating with said second end of said mixing chamber, said mixing chamber having an inner peripheral surface, an air inlet port and a fuel inlet port, both said air inlet and fuel inlet ports being provided on the same circumference of said inner peripheral surface of said mixing chamber, and located at a predetermined distance from one-another;
an air supply pipe connected to said air inlet port in such a position as to introduce air into said mixing chamber to cause the air to flow within said mixing chamber in a rotational direction along said inner peripheral surface of said mixing chamber;
a fuel supply pipe connected to said fuel inlet port in such a position as to introduce fuel into said mixing chamber in a direction opposite the direction in which said air rotates; and
an igniting member mounted on said main body to extend into the interior of said mixing chamber and intended to ignite a mixture of said air and fuel introduced into said mixing chamber.

2. A pulse combustor according to claim 1, wherein said air supply pipe is position such that the axis of said air supply pipe is inclined, with respect to a straight line intersecting an axis of said mixing chamber at right angles and passing through a center of said air inlet port, at a predetermined angle toward said fuel inlet port.

3. A pulse combustor according to claim 2, wherein said fuel supply pipe is positioned such that the axis of said fuel supply pipe is inclined, with respect to a straight line intersecting the axis of said mixing chamber at right angles and passing through a center of said fuel inlet port, at a predetermined angle toward said air inlet port.

4. A pulse combustor according to claim 3, wherein the angle defined between said axis of said air supply pipe and said axis of said fuel supply pipe is generally 90° or less.

5. A pulse combustor according to claim 4, wherein said angle defined between said axis of said air supply pipe and said axis of said fuel supply pipe is between approximately 40° to 80°.

6. A pulse combustor according to claim 5, wherein said air supply pipe and fuel supply pipe are provided so that the axes of said air supply and fuel supply pipes intersect on said inner peripheral surface of said mixing chamber.

7. A pulse combustor according to claim 6, wherein said igniting member is radially located between a point of intersection of the respective axes of said air supply pipe and fuel supply pipe and the center of said fuel inlet port, and said igniting member is axially located at a position having a distance from the center of said fuel inlet port toward said combustion chamber equal to or greater than ⅓ of the distance between the center of said fuel inlet port and the position at which said mixing chamber is connected to said combustion chamber.

8. A pulse combustor according to claim 3, wherein said air supply pipe and fuel supply pipe are disposed on the same plane intersecting the axis of the mixing chamber at right angles thereto.

9. A pulse combustor according to claim 1, which further includes directing means located on said inner peripheral surface of said mixing chamber abutting the peripheral edge of at least one of said air inlet and fuel inlet ports, said directing means directing fuel introduced from said fuel inlet port into said mixing chamber toward the center of said mixing chamber.

10. A pulse combustor according to claim 9, wherein said directing means includes a first projection provided on said peripheral edge of said fuel inlet port toward the side of said air inlet port.

11. A pulse combustor according to claim 10, wherein said first projection protrudes from the inner surface of said mixing chamber radially and inwardly thereof, and extends linearly in the axial direction of said mixing chamber.

12. A pulse combustor according to claim 10, wherein said directing means includes a second projection provided on said peripheral edge of said air inlet port toward the side of said fuel inlet port.

13. A pulse combustor according to claim 12, wherein said second projection protrudes from the inner surface of said mixing chamber radially and inwardly thereof, and extends linearly in the axial direction of said mixing chamber.

14. A pulse combustor according to claim 12, wherein said directing means further includes:
a third projection provided on said peripheral edge of said fuel inlet port opposite said first projection, and
a fourth projection provided on said peripheral edge portion of said air inlet port opposite said second projection.

15. A pulse combustor according to claim 9, wherein said directing means includes a first ring-shaped projection provided along said peripheral edge of said fuel inlet port.

16. A pulse combustor according to claim 15, wherein said fuel supply pipe protrudes into said mixing chamber and said first ring-shaped projection is formed by said fuel supply pipe protrusion.

17. A pulse combustor according to claim 15, wherein said directing means includes a second ring-shaped projection provided along said peripheral edge of said air inlet port.

18. A pulse combustor according to claim 17, wherein said air supply pipe protrudes into said mixing chamber and said second ring-shaped projection is formed by said air supply pipe protrusion.

19. A pulse combustor according to claim 9, wherein said directing means includes an arc-shaped projection provided along that portion of said inner peripheral surface of said mixing chamber which extends from said peripheral edge of said air inlet port located toward the side of the fuel inlet port, to said peripheral edge of said fuel inlet port located toward the side of the air inlet port.

20. A pulse combustor according to claim 1, wherein:
said air supply pipe is positioned such that the axis of said air supply pipe is inclined, with respect to a straight line intersecting an axis of said mixing chamber at a right angle, passing through the center of said air inlet port, at a predetermined angle toward' said fuel inlet port;
and said fuel supply pipe is positioned such that the axis of said fuel supply pipe is inclined, with respect to a straight line intersecting the axis of said mixing chamber at a right angle, passing through the center of said fuel inlet port, at a predetermined angle toward said air inlet port.

* * * * *